Dec. 9, 1947.  N. M. EDSON ET AL  2,432,398
ROTARY BELT LOADING MACHINE WITH CARTRIDGE PUSH RODS
Filed Oct. 13, 1943   5 Sheets-Sheet 1

INVENTORS
Noël M. Edson
BY Earl B. Hoback
Harold L. Gammons
AGENT

Dec. 9, 1947.                N. M. EDSON ET AL                2,432,398
          ROTARY BELT LOADING MACHINE WITH CARTRIDGE PUSH RODS
                    Filed Oct. 13, 1943          5 Sheets-Sheet 2

INVENTORS
Noel M. Edson
BY Earl B. Hoback
Harold L. Gammons
AGENT

Dec. 9, 1947.   N. M. EDSON ET AL   2,432,398
ROTARY BELT LOADING MACHINE WITH CARTRIDGE PUSH RODS
Filed Oct. 13, 1943   5 Sheets-Sheet 3

INVENTORS
Noel M. Edson
BY Earl B. Hoback
Harold L. Gammons
AGENT

Dec. 9, 1947.   N. M. EDSON ET AL   2,432,398
ROTARY BELT LOADING MACHINE WITH CARTRIDGE PUSH RODS
Filed Oct. 13, 1943   5 Sheets-Sheet 4

INVENTORS
Noel M. Edson
BY Earl B. Hoback
Harold L. Gammons
AGENT

Dec. 9, 1947.　　　N. M. EDSON ET AL　　　2,432,398
ROTARY BELT LOADING MACHINE WITH CARTRIDGE PUSH RODS
Filed Oct. 13, 1943　　　5 Sheets-Sheet 5
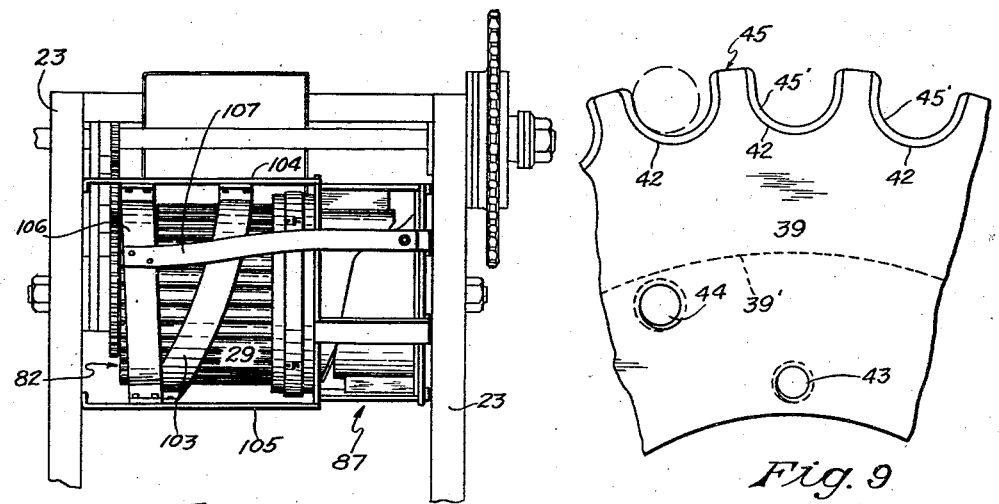
Fig. 11
Fig. 9
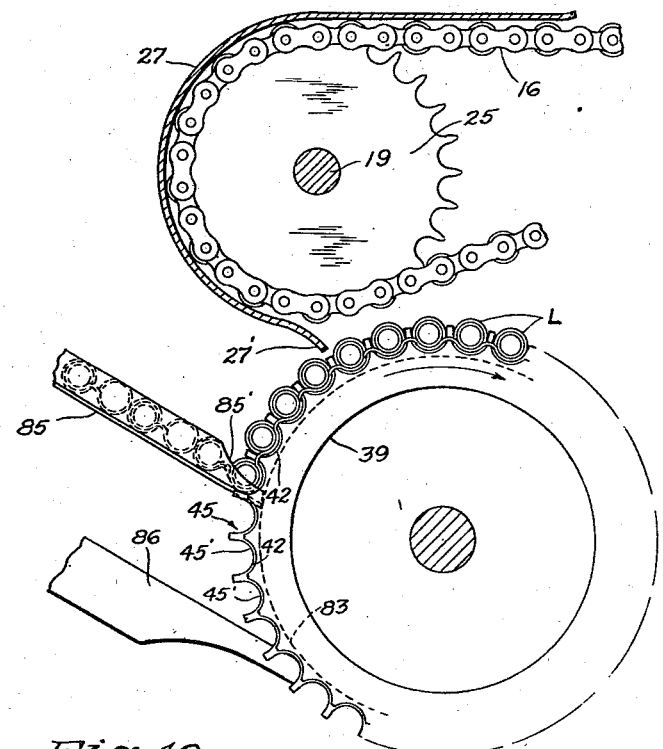
Fig. 10
INVENTORS
Noel M. Edson
BY Earl B. Hoback
Harold L. Gammons
AGENT Patented Dec. 9, 1947

2,432,398

UNITED STATES PATENT OFFICE 2,432,398

ROTARY BELT LOADING MACHINE WITH CARTRIDGE PUSH RODS

Noel M. Edson, Independence, and Earl B. Hoback, Kansas City, Mo., assignors to Remington Arms Company, Inc., Bridgeport, Conn., a corporation of Delaware Application October 13, 1943, Serial No. 506,065

3 Claims. (Cl. 86—48)

This invention relates, in general, to ammunition manufacture, and, in particular, to a machine for automatically forming cartridge belts of the disintegrating link type.

The link belt loading machine of this invention is adapted to be supplied continuously with cartridges from a conveyor belt which is arranged to feed cartridges of various types to the loading machine in predetermined sequence, the latter being constructed and arranged, as hereinafter described, to couple the interengaged metal links and the cartridges to provide a flexible belt-like structure. It will be understood, however, that the conveyor belt mechanism is not a part of the present invention, the conveyor being described and illustrated in detail in a copending application, filed October 13, 1943, S. N. 506,064.

An object of the present invention is to provide an improved link belt loading machine for forming cartridge belts continuously without the intervention of an operator and at extremely rapid rate. A further object is to provide a link belt loading machine which is adapted to insert cartridges in interengaged links without scratching or otherwise marring the heads or surfaces of the cartridges.

These and other objects, features and advantages of the invention will be pointed out in greater detail in the following specification which describes certain novel features in the construction of one embodiment of the invention shown in the accompanying drawings.

In the drawings:

Fig. 9 is a fragmentary side elevation of the link retaining plate of the drum.

Fig. 10 is a diagrammatic side elevation of the drum and conveyor belt showing the chute for feeding links to the drum and the blade for stripping the link belt from the drum.

Fig. 11 is a schematic rear elevation of the machine showing suitable leather belts circumscribing the loading drum.

Figure 1:
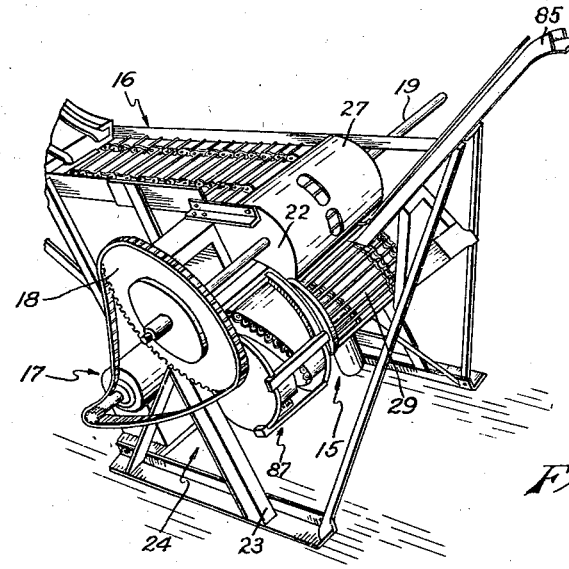
Fig. 1 is a perspective diagrammatic view of the link belt loading machine shown in conjunction with a suitable conveyor belt for feeding cartridges to the loading machine.

As shown in the drawings, the link belt loading machine, indicated generally at 15 in Fig. 1, is in the present embodiment associated with a suitable conveyor belt 16 which is the subject of the separate above-identified application, and, to this end, both the conveyor belt and link belt loading machine are driven from a single power source shown at 17 by means of a chain and sprocket drive 18, the sprocket being suitably mounted, as hereinafter described, to rotate a main drive shaft 19 which is supported at its opposite ends by flanged bronze bushings 20 mounted in a pair of bearing plates 22 respectively which extend in spaced parallel relation from the front legs 23 of the conveyor belt supporting frame, indicated generally at 24.

Figure 4:
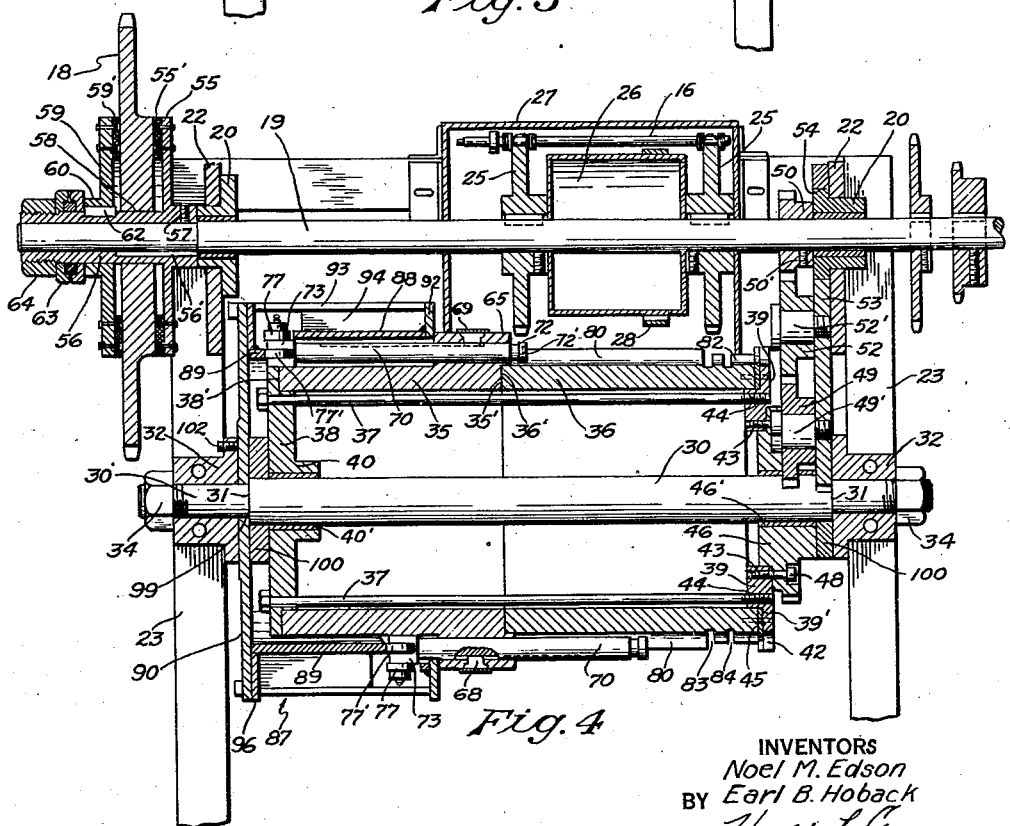
Fig. 4 is a front elevation, in section, of the loading machine showing the conveyor belt mechanism associated therewith.

As shown in Fig. 4, a pair of laterally spaced sprocket wheels 25 are keyed to the drive shaft 19 between which is a fixed drum-shaped feeding head 26 supported on the drive shaft 19. A pair of links of the conveyor belt 16 are shown engaged in corresponding teeth of the sprockets 25.

Figure 5:
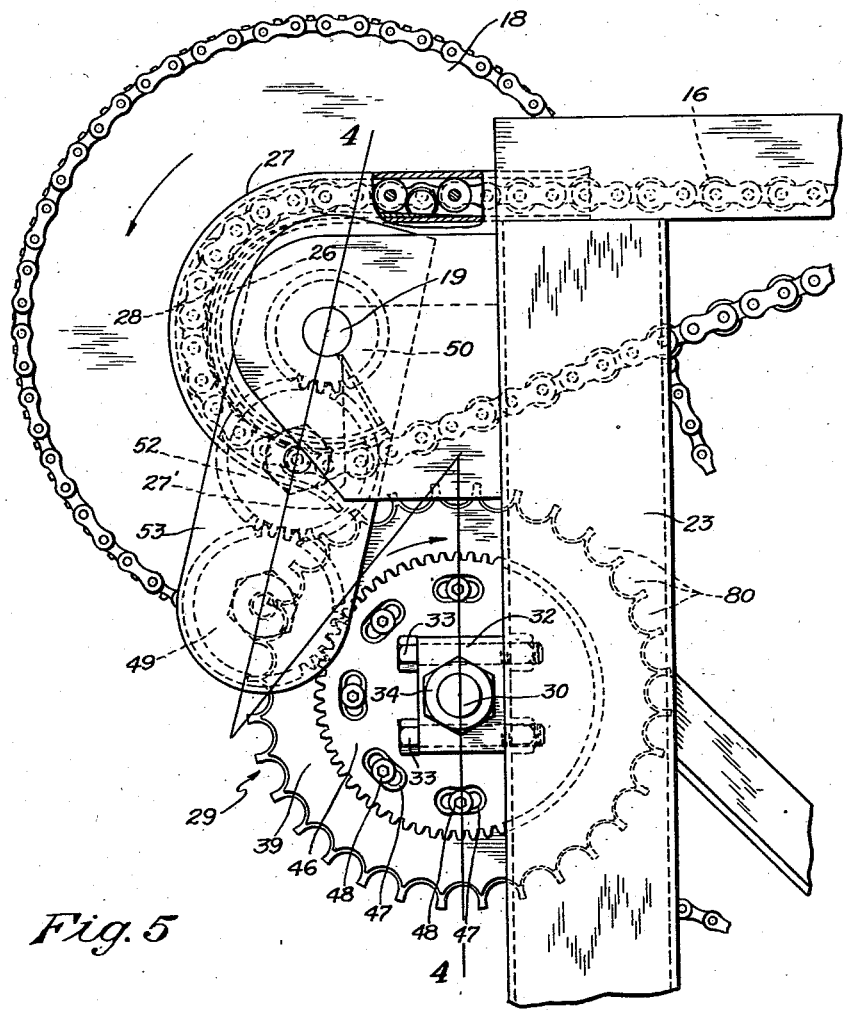
Fig. 5 is a side elevation of the loading machine in the direction of the arrows 5—5 of Fig. 2.

As the sprockets are rotated, the conveyor chain will be drawn along the substantially horizontal trough of the frame 24, see Fig. 1, and over the surface of the feeding head 26 at the end of the trough so that cartridges which are supported on the bottom of the trough between the successive links of the chain will be carried forwardly onto the surface of the feeding head as indicated in Fig. 5. Moreover, a cylindrical shield or cover 27 is shown fastened on the end of the frame over the feeding head 26 and is spaced circumferentially therefrom so as to hold the cartridges in the belt as they move around the periphery of the feeding head. The lower lip 27' of the shield 27 is, as shown in Fig. 5, adapted to extend in proximity to the periphery of a fluted loading drum hereinafter described. A narrow substantially flat band 28 is arranged around the feeding head 26 adjacent one end thereof and slightly eccentric to its periphery to support the tapered ends of the cartridges so as to prevent the cartridges from jamming between the links of the conveyor belt 16.

Although the above mentioned conveyor belt is one especially adapted for use with the link belt loading machine of this invention, it will be understood that the latter is not limited thereby and that other means than the conveyor belt referred to may be used to supply cartridges in proper sequence to the loading machine.

The loading machine 15 embodies a rotating loading drum, indicated generally at 29, supported between the legs 23 of the frame by a shaft 30, each end of which is reduced in diameter as at 30' forming shoulders 31, the reduced ends 30' being mounted in suitable flanged brackets 32 which are fastened to the legs 23 by bolts 33. Suitable nuts 34 are provided on the threaded ends of the shaft 30 to securely fasten the shaft against longitudinal movement in the brackets 32.

The drum 29 is a composite structure comprising two cylindrical members 35 and 36 arranged in end-to-end relation, the latter having a cylindrical tongue 36' at one end adapted to fit in a cylindrical mortise 35' in the adjacent end of the member 35, as shown in Fig. 4. The two cylindrical members are held in assembled relationship by four tie rods 37 and a pair of end plates 38 and 39 respectively, the plate 38 having a circumferential mortise 38' to seat the adjacent end of the cylindrical member 35, and four circumferential equally spaced apertures for the tie rods 37. The plate 38 also embodies a hub portion 40 provided with a bushing 40' adapted to fit nicely on the shaft 30, thus providing means for rotatably supporting this end of the loading drum.

The end plate 39 at the opposite end of the loading drum is in the form of an annulus provided with a circumferential mortise 39', peripheral serrations 42 on the outer edge of the annulus, a plurality of circumferential equally spaced tapped holes 43 adjacent the inner edge of the annulus and four circumferential equally spaced tapped holes 44, as shown in Fig. 9.

The threaded ends of the tie rods 37 are adapted thus to be screwed in the tapped holes 44 to draw together the end plates 38 and 39 and the respective cylindrical members 35 and 36 in a unitary rigid structure.

Referring to Fig. 4, interposed between the inner face of the circumferential mortise 39' and the adjacent end of the cylindrical member 36 is a pressure plate in the form of a thin hardened steel annulus 45, the periphery of which is provided with serrations 45' corresponding in number to the number of serrations 42 of the end plate 39. As shown in Fig. 9, the radii of the serrations 45' are slightly less than the radii of the serrations 42 so that the edges of the former extend above the edges of the serrations 42 for the purpose hereinafter described.

Fastened to the outside of the end plate 39 is a gear plate 46, the latter having circumferentially equally spaced counterbored slots 47 therein for suitable headed bolts 48 which are adapted to be screwed into the tapped holes 43 of the end plate 39. By providing slots 47 in the gear plate 46, the latter may be adjusted circumferentially with respect to the drum 29. The gear plate 46 comprises a hub having a bushing 46' adapted to fit nicely on the shaft 30 so as to rotatably support the right-hand end of the drum.

The gear plate 46 is driven from the main drive shaft 19 through a gear train comprising two spur gears 49 and 50 and an idler gear 52, the gears 49 and 52 being rotatably mounted on suitable stud shafts 49' and 52' respectively which are threadedly secured in a hanger bar 53. The latter is provided at its upper end with a bored hole 54 of a diameter such as to fit nicely over the flange of the bushing 20 as shown in Fig. 4. The spur gear 50 is secured to rotate with the drive shaft by a set screw 50'.

As mentioned above, the drive shaft 19 is driven from the power source 17 by the chain and sprocket drive 18. In order to avoid destruction of the parts of the machine in the event of a jam or other malfunction, the sprocket 18 is connected to the drive shaft 19 by a friction clutch comprising a friction disk 55 having an annular friction ring 55' on its inner face adapted to contact the adjacent face of the sprocket 18; and a relatively long sleeve-like hub 56 fastened to the shaft 19 by a key 56' and set screw 57. The sprocket 18 is provided with an axially drilled hole of a diameter to make a smooth running fit on the portion 58 of the hub 56. A second friction disk 59 is provided having an annular friction ring 59' adapted to engage the adjacent face of the sprocket 18; and a hub portion 60, the latter being suitably secured to the outer end of the hub 56 by a key 62. The friction disk 59 is held against endwise movement on the shaft 19 by a suitable lock washer 63 and a nut 64, the latter providing means for adjusting the friction force between the friction disks 55 and 59 and the sprocket 18.

In accordance with the above construction, rotation of the sprocket 18 in the direction of the arrow in Fig. 5 drives the loading drum 29 in the reverse or clockwise direction.

As pointed out above, the loading drum 29 comprises the two cylinders 35 and 36 secured together in endwise relation by the tie rods 37. The cylinder 35 is formed at its inner end with an annular flange 65 having a shoulder 65', see Fig. 6, and provided with a plurality of circumferentially equally spaced horizontally drilled holes hereinafter termed sleeves 66, thirty-two holes being shown in the present embodiment. A plurality of relatively narrow substantially rectangular closed slots 67 having countersunk shoulders 67' at each end are formed in the flange 65, the longitudinal axis of each slot being in alignment with the longitudinal axis of one of the sleeves 66, respectively. Each slot 67 is adapted to receive a substantially flat T-shaped key 68 which is supported on the shoulders 67', the upper surface of each key being substantially flush with the periphery of the flange 65.

The keys 68 are held in their respective slots by a plurality of retaining bands 69, four being shown in the present embodiment, suitably secured by screws or other fastening means around the periphery of the flange 65.

Slidable in each sleeve 66 of the flange is a cylindrical push rod 70 having a longitudinal keyway in its surface of predetermined length adapted to accommodate the protruding end of one of the keys 68, whereby the latter may both limit the longitudinal movement of the rod and prevent rotation thereof in its sleeve 66. The inner end of each push rod 70 is provided with a head or bunter 72 which is of less diameter than the diameter of the flange of a cartridge C and may be provided with a suitable recess 72' in its face adapted to come opposite the primer cap of the cartridge when the bunter is brought into engagement therewith as hereinafter described.

Figure 6:
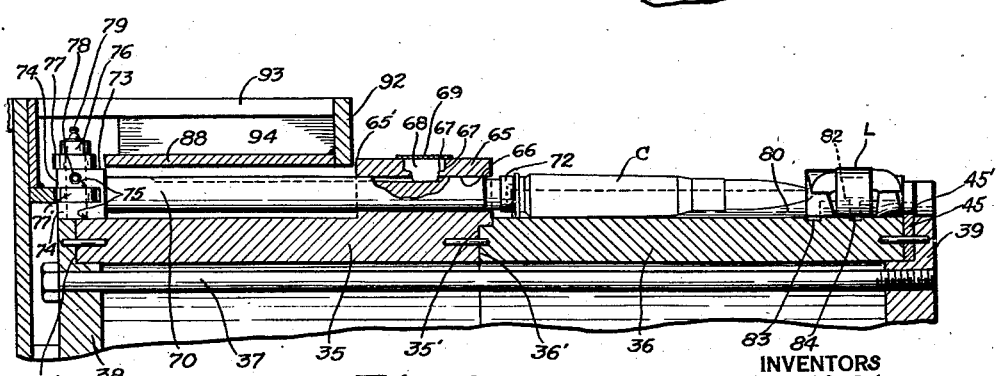
Fig. 6 is an enlarged fragmentary sectional elevation of the fluted loading drum of Fig. 4, showing one of the pusher rods and the cam surfaces associated therewith.
Figure 7:
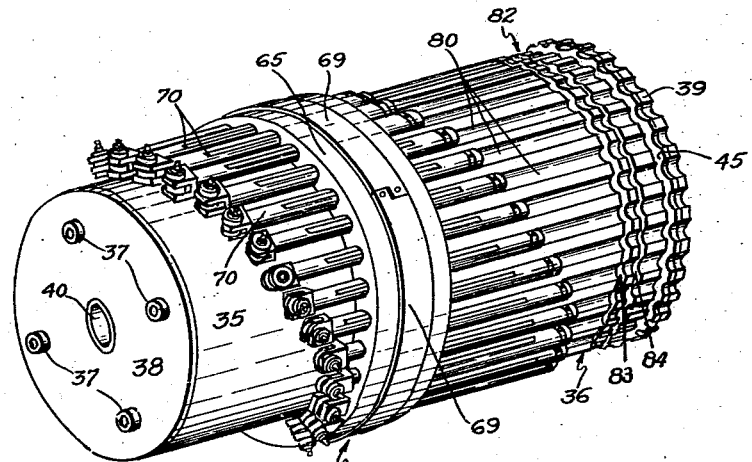
Fig. 7 is a perspective view of the fluted loading drum showing the pusher rods thereon and the relief milling and slots for supporting the links.

The outer or rear end of each rod 70 terminates in a substantially cubical-shaped block 73 which is bifurcated in the plane of its horizontal axis to provide a pair of spaced parallel flanges 74. A hole 75 is drilled vertically through both the upper and lower flanges 74 centrally thereof to receive a headed pin 76, as shown in Fig. 6.

A pair of cam rollers 77 and 77' are rotatably mounted by one of the pins 76 in each of the bifurcated blocks 73 of the rods 70, one roller, hereinafter termed the return cam roller 77, being adapted to rest on the top surface of the upper flange 74. The lower roller, hereinafter termed the feed cam roller 77', is shown mounted between the upper and lower flanges of the block 73. A set screw 78 is threadedly secured in the side of the upper flange 74 of each block 73 to engage and hold the respective pin 76 in position. A suitable oil or grease fixture 79 is shown mounted in the top of each pin 76 and is adapted to supply lubricant to the cam rollers 77 and 77'.

It will be understood that the lower surface of the bifurcated block 73 of each push rod 70 is adapted to slide longitudinally on the smooth peripheral surface of the cylinder 35 being guided by the reciprocating movement of the push rod 70 in its respective sleeve 66.

The periphery of the cylinder 36 of the drum 29 is fluted, as shown in the drawings, being provided with thirty-two longitudinal curvilinear grooves or flutes 80, each in substantially the horizontal plane of and in longitudinal alignment with one of the push rods 70. The flutes 80 extend the entire length of the cylinder 36, the walls thereof being of substantially uniform height for a major portion of their length.

In the present embodiment, the height of these walls is sufficient to confine a cartridge case C of .50 caliber dimensions. The portions of the flutes 80, adjacent the right-hand end of the cylinder, are relief milled as at 82 so that the height of these walls is slightly less than the height of the walls of the remaining portions of the flute. These relief milled portions 82 are thus adapted to provide suitable supporting means for the clips or links L which are automatically fed thereto as hereinafter described. A pair of spaced parallel periphery grooves or slots 83 and 84 of substantially equal depth are cut or otherwise formed around the relief milled portion 82, the slot 83 defining the inner edge of the milled portion 82 and being slightly wider than the slot 84. As shown, the latter is located substantially at the middle of the milled portion 82 and is adapted to constitute a guide for a feed chute 85 which is of conventional construction and adapted to feed clips L successively and at a uniform rate to the flutes of the rotating drum 29, the lower end of the chute being held properly adjacent the fluted periphery of the drum by means of a tongue portion 85' which extends from the end of the chute and is adapted to engage in the peripheral groove 84 of the drum. The peripheral groove 83 is provided to accommodate the end of a stripper blade 86 which is fastened to the frame of the machine in any convenient manner and is adapted to engage the links of the completed belt to strip the completed belt from the flutes of the drum.

As hereinafter described in detail, when the drum 29 rotates the push rods 70 are adapted to be moved forwardly successively in their respective sleeves 66 so as to push the cartridges C along the flutes 80 into pairs of interengaged links L, thus interlocking successive pairs of links and automatically forming an unbroken length of cartridge belt.

Figure 8:
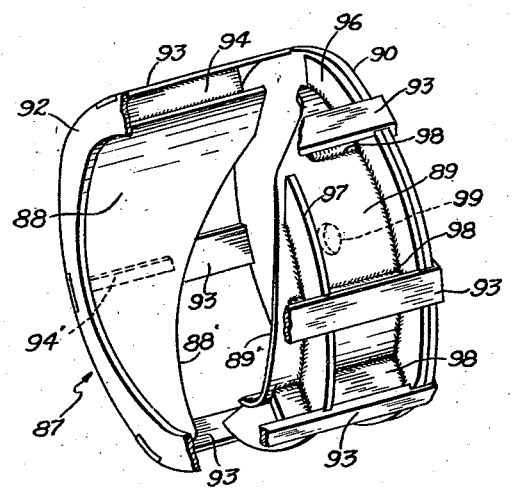
Fig. 8 is a fragmentary perspective view of the cam drum adapted to be associated with the loading drum.

The means for reciprocating the push rods 70 as the drum 29 rotates comprises a cam drum, indicated generally at 87, which, as shown in Fig. 8, embodies two cylindrical surfaced cam plates 88 and 89 supported in a cage comprising a disk 90 and a ring 92 which are held apart in suitably spaced parallel relationship by a plurality of connecting bars 93 welded or otherwise secured at their opposite ends to the disk 90 and ring 92 at circumferentially spaced points thereon.

Figure 2:
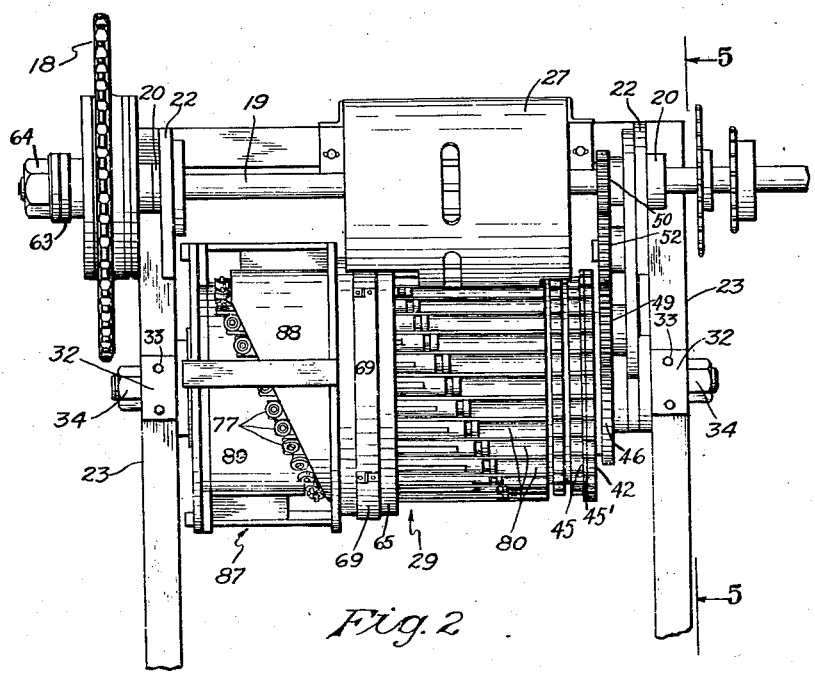
Fig. 2 is a front elevation of the loading machine not including the link feeding chute.
Figure 3:
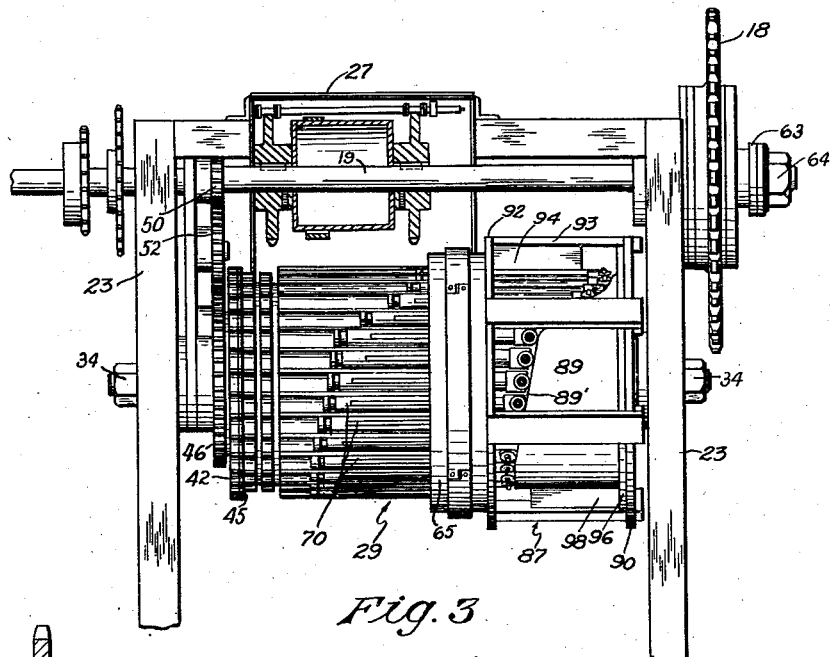
Fig. 3 is a rear elevation of the loading machine shown in Fig. 2.

The cam plate 88, hereinafter referred to as the return cam, is fastened to the front half of the cage 87, as shown in Figs. 1 and 2, by means of radial spacer blocks 94 which are welded along their outer edges to the inner surfaces of the connecting bars 93 and along their inner edges to adjacent areas on the surface of the return cam plate 88. The right-hand edge of the cam plate 88 is welded to the inner face of the ring 92 while the left-hand edge 88' of the cam plate constitutes a cam surface adapted to be engaged by the upper or return cam roller 77 of the push rods 70, as shown in Fig. 4. The cylindrical cam plate 89, hereinafter termed the feed cam, is located at the back of the cage, as shown in Fig. 8, concentric with the return cam plate 88 but of less diameter by an amount corresponding to the vertical distance between the upper and lower rollers 77 and 77' of the push rods, as shown in Fig. 4. To this end a ring segment 96 is welded to the inner face of the disk 90 at the outer edge thereof, the outer edge of the ring segment being substantially flush with the periphery of the disk 90. The inner edge of the segment constitutes a shoulder for supporting the right-hand edge of the feed cam plate 89 to which the latter is welded, as shown in Fig. 8.

A second ring segment 97 is provided which is arranged adjacent the left-hand edge of the cam plate 89 being welded along its inner edge, like the segment 96, to the outer surface of the cam plate 89 and along its outer edge to the connecting bars 93. Further suitable radial spacer blocks 98 are provided which are of greater height than the spacer blocks 94, as shown in Fig. 4, and which are connected to the adjacent surfaces of the cam plate 89, the connections between the bars 93 and the segments 96 and 97 being welded joints. The left-hand edge of the follower cam plate constitutes a cam surface 89' adapted to be engaged by the follower cam rollers 77' of the push rods 70.

The cam drum 87 is supported in proper relation to the loading drum 29 by providing an axially drilled hole 99 in the disk 90 such that the disk may be supported on the reduced end 30' of the shaft 30 abutting the shoulder 31 thereof, as shown in Fig. 4. A suitable spacer ring 100 having radial oil grooves, not shown, is mounted on the shaft 30 between the disk 90 and the end plate 38 of the rotatable loading drum to properly space the loading drum longitudinally with respect to the fixed cam drum 87. A similar spacer ring 100 is provided on the opposite end of the shaft 30 between the outer face of the gear plate 46 and the flange of the bracket 32.

It will be understood that the friction force between the contacting surfaces of the disk 90 and the flange of the bracket 32 is sufficient to prevent rotation of the cam drum 87 but additional means may be provided such as a set screw 102 screwed into a tapped hole in the flange of the bracket 32 and adapted to engage the adjacent surface of the disk 90 to positively prevent the cam drum 87 from moving when the loading drum 29 rotates.

To insure against deflection of the outer ends of the rods 70 as the latter reach their more advanced positions in their flutes especially on the underside of the loading drum and to retain the cartridges in the flutes, flexible retaining means may be provided such as a leather belt 103, see Fig. 11, secured at its upper and lower ends to the frame or to other fixed parts such as the members 104 and 105, each of which is bolted at one end to the frame and secured at its opposite end to the fixed cam drum 87.

As indicated in the drawings, the belt is arranged to circumscribe, sinuously, substantially the back half of the loading drum 29. A second leather belt 106 is similarly secured at its upper and lower ends to the members 104 and 105 partially circumscribing the relief milled portion 82 of the fluted drum 29 so as to hold the links L in their respective flutes during the interlocking of the links by the cartridges and until the completed belt has been carried around to a suitable discharge point. An additional supporting means 107, comprising a metal or stiff leather strap, is shown bolted at one end to the fixed cam drum 87 and riveted at its opposite end to the link retaining strap 106.

In operation, cartridges of various types and arranged in predetermined sequence are fed continuously by the conveyor chain 16 over the periphery of the feeding head 26 and discharged therefrom at the lip 27' of the feeding head cover 27 into the flutes 80 of the loading drum. Simultaneously the links L of the cartridge belt are being fed from the chute 85 into the flutes 80 adjacent the relief milled portion 82 thereof, successive links being fed in interengaged relationship into the flutes at a point on the periphery of the drum below the discharge lip 27', as shown in Fig. 10; that is to say, the loading of the links L into the flutes precedes the loading of the cartridges therein.

Referring to Figs. 4 and 6, the arrangement of the returning and feeding cam surfaces 88' and 89' respectively is such that a push rod 70 of the loading drum will be fully retracted in its sleeve 66 at the moment its corresponding flute 80 is opposite the discharge lip 27' of the conveyor belt. Consequently, a cartridge C is enabled to drop freely into the flute. As the loading drum rotates clockwise, see Fig. 10, the feeding cam roll 77' of the push rod 70 will engage the feeding cam surface 89' on the back side of the fixed cam drum 87 and will be advanced thereby towards the right end of the machine, as seen in Fig. 6. The cartridge C will thereby be gradually pushed along its flute as the loading drum rotates until the bullet and neck portions of the cartridge pass through the encircling bands of two of the interengaged links L at the right-hand end of the drum, thereby locking the two links together. The pressure exerted by the cartridge against the interengaged links L, as the cartridge is being pushed therein, is resisted by the hardened steel pressure plate 45, the lip 45' of which is disposed slightly above the bed of the corresponding flute 80, as described above, so as to engage the lower edges of the links L and prevent longitudinal movement thereof. The bullet and mouth portion of the cartridge are free to pass through the serrations 42 of the end plate 39.

When a push rod 70 has been fully advanced in its sleeve 66 by the feed cam 89, a cartridge will have been fully advanced into a pair of interengaged links, and thereafter the return cam roll 77 of the push rod 70 engages the fixed return cam surface 88' of the cam drum and is withdrawn thereby in its flute to its initial position.

In a similar manner, each successive push rod 70 will be advanced and force a cartridge into corresponding interengaged links L, thereby locking the links together and forming a cartridge belt of unbroken length. Thereafter each rod 70 is retracted by the returning cam to its initial position.

Should the interlocked links of the cartridge belt become jammed or stick in the flutes of the loading drum, the belt will be carried around with the drum until the belt comes opposite the stripper blade 86. Thereupon, the links would ride up on the blade 86, which extends into the peripheral groove 83, so that the blade would act as a pry for loosening the links and stripping the belt from the drum.

It will be clear from the above description and drawings that the link belt loading machine of this invention is adapted to form a cartridge belt of unbroken length continuously and without scratching or forming burrs on the case. Moreover, the loading operation takes place without the intervention of any manual operation and is relatively rapid, the machine being capable of loading a link belt at the rate of four hundred cartridges per minute.

What is claimed is:

1. In a machine for forming belts of cartridges, a cartridge receiving drum having a fluted surface, means for rotating said drum, means for delivering cartridges successively into the flutes of said drum, chute means for holding and delivering interengaged links into said flutes in alignment with the delivered cartridges, guide means for said chute means comprising a peripheral groove in said drum and a projection on said chute means engaged in said groove, means for moving said cartridges into said interengaged links comprising a series of push rods mounted on said drum and associated respectively with said flutes for longitudinal movement therein, cartridge engaging means on one extremity of said rods and cam engaging means at the opposite extremity, and actuating means for said push rods consisting of a fixed unitary cam drum concentric and in longitudinal alignment with said rotating drum and comprising push rod advancing and retracting cams.

2. In a machine for forming belts of cartridges, a cartridge receiving drum having a fluted surface, means for rotating said drum, means for delivering cartridges successively into the flutes of said drum, chute means for holding and delivering interengaged links into said flutes in alignment with the delivered cartridges, means for moving said cartridges into said interengaged links comprising a series of push rods associated respectively with said flutes, mounting and supporting means for said push rods comprising an apertured ring associated with said cartridge receiving drum and a second push rod supporting drum concentric and in longitudinal alignment with said cartridge receiving drum, and push rod actuating means consisting of a fixed cam drum concentric with and surrounding said second drum and comprising push rod advancing and retracting cams.

3. In a machine for forming belts of cartridges, a cartridge receiving drum having a fluted surface, means for rotating said drum, means for delivering cartridges successively into the flutes of said drum, chute means for holding and delivering interengaged links into said flutes in alignment with the delivered cartridges, means for moving said cartridges into said interengaged links comprising a series of push rods associated respectively with said flutes, mounting and supporting means for said push rods for longitudinal non-rotational movement comprising an apertured ring associated with said cartridge receiving drum and a second push rod supporting drum concentric and in longitudinal alignment with said cartridge receiving drum, push rod actuating means consisting of a fixed cam drum concentric with and surrounding said second drum and comprising a push rod advancing cam and a push rod retracting cam, and a pair of rollers supported at one extremity of each of said push rods for engagement respectively by said advancing cam and said retracting cam.

NOEL M. EDSON.
EARL B. HOBACK.

REFERENCES CITED

The following references are of record in the file of this patent:

UNITED STATES PATENTS

| Number | Name | Date |
|---|---|---|
| 9,439 | Colver | Dec. 7, 1852 |
| 2,094,026 | Simpson | Sept. 28, 1937 |
| 2,289,393 | Turnock | July 14, 1942 |

FOREIGN PATENTS

| Number | Country | Date |
|---|---|---|
| 539,184 | Great Britain | Sept. 1, 1941 |
| 656,629 | Germany | Feb. 10, 1938 |